March 1, 1932.  E. A. LONERGAN  1,847,489
ELECTRIC WATER HEATER
Filed June 23, 1930
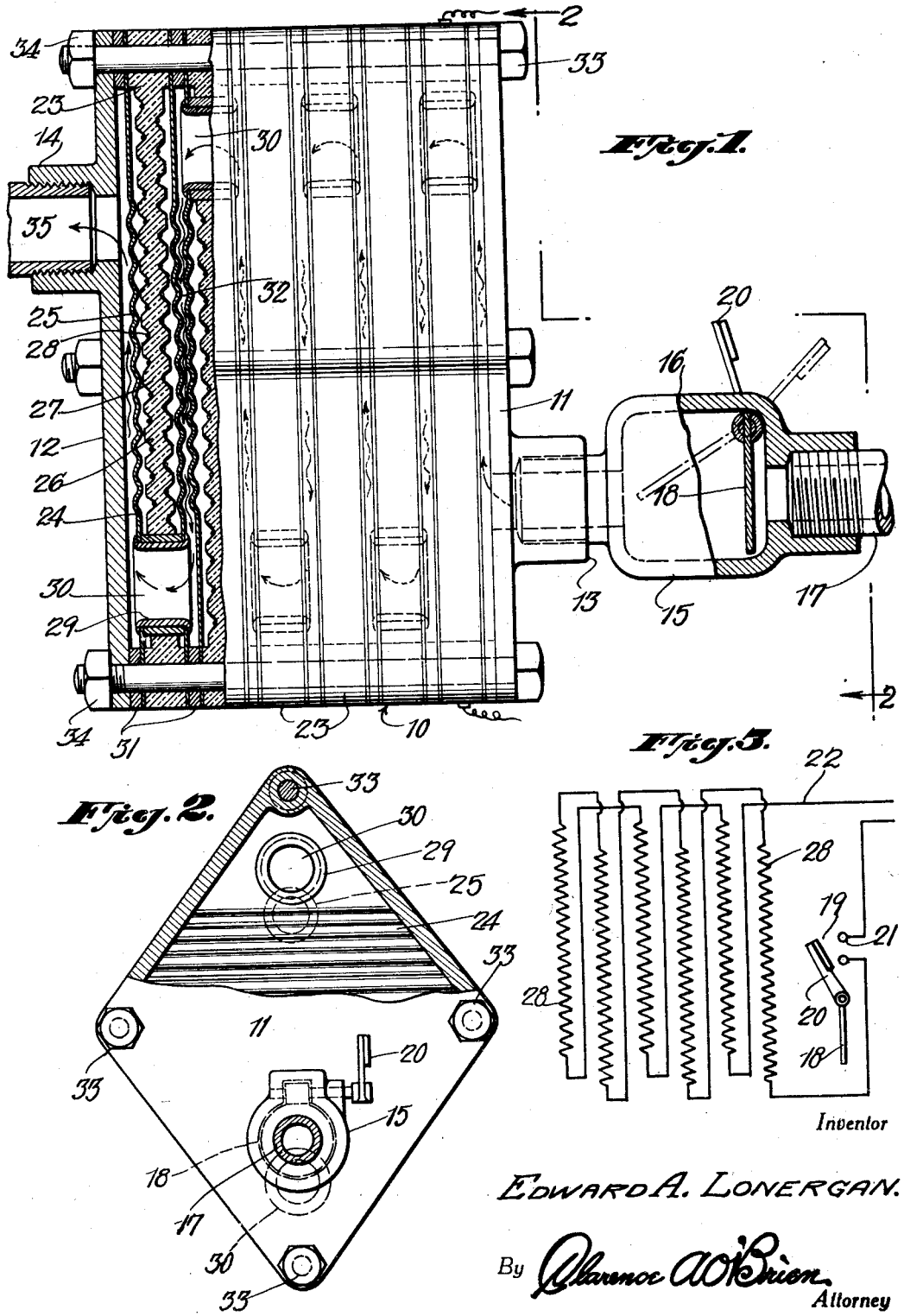
Inventor
Edward A. Lonergan.
By Clarence A. O'Brien
Attorney Patented Mar. 1, 1932

1,847,489

UNITED STATES PATENT OFFICE

EDWARD A. LONERGAN, OF BROOKLYN, NEW YORK

ELECTRIC WATER HEATER

Application filed June 23, 1930. Serial No. 463,131.

This invention relates to improvements in electric water heaters of the instantaneous type.

The primary object of the invention resides in an electric water heater which will efficiently heat water passing therethrough, the same adapted to be arranged in a hot water supply system to instantly heat the water supply upon the turning on of the hot water faucet.

Another object of the invention is to provide an electric water heater in which the water is made to pass between sets of closely spaced corrugated walls, there being electric heating elements interposed between the walls of the sets for heating the same, while the water spaces between the walls communicate in a manner to cause the water to pass alternately in opposite directions.

A further object is the provision of an electric water heater made up of units to enable the assembling of any number of units necessary to thoroughly heat the flow of water in systems of various pressures or capacities.

A still further object aims to provide a novel electric switch means which is automatically operable by the water pressure of the water supply system, so as to automatically turn the heater on and off upon the likewise turning of the control faucet.

With these and other objects in view the invention resides in the certain novel construction, combination and arrangement of parts, the essential features of which are hereinafter fully described, are particularly pointed out in the appended claim, and are illustrated in the accompanying drawings, in which:

Figure 1 is a side elevational view partly in section illustrating my improved electric water heater.

Figure 2 is a vertical transverse sectional view on the line 2—2 of Figure 1 with a portion of one of the end walls broken away.

Figure 3 is a diagrammatic view of the electric circuit.

Referring to the drawings by reference characters, the numeral 10 designates my improved electric water heater in its entirety which includes end walls or plates 11 and 12, the same being provided with an inlet and outlet nipple 13 and 14 respectively. The inlet and outlet provided by the nipples 13 and 14 are offset with respect to each other for a purpose to be hereinafter appreciated.

Connected to the inlet nipple 13 is a coupling member 15 which includes a hollow chamber or compartment 16. One end of the coupling member 15 is threaded to the inlet nipple 13, while the opposite end connects with a water supply pipe 17. Pivoted within the compartment 16 and disposed in the path of the water adapted to pass therethrough is a plate 18 of an electric switch 19. Fixed to the plate 18 and extending beyond the compartment 16 is a switch arm 20 adapted to move into contacting engagement with the contact 21 arranged in an electric circuit 22 shown in Figure 3 of the drawings.

Interposed between the end walls of the plates 11 and 12 are any number of heating units 23, each of which includes a pair of spaced heating walls 24, which walls are corrugated intermediate their ends as at 25, while interposed between the walls 24 of each unit is a heating element 26 embodying a core of insulating material 27 on which an electric heating coil 28 is wound. A collar or eyelet 29 tends to bind the walls of the units together and provide an opening 30 adjacent one end of the same.

In assembling the heater, any number of heating units 23 may be provided, and the same are positioned in spaced relation to each other with the openings 30 of one unit disposed opposite the openings 30 of the next adjacent unit. Gaskets or washers 31 are interposed between the respective units and between the end units and the plates 11 and 12 so as to provide undulated water passages 32 between the respective units and the end walls 11 and 12. The units are held in assembled position by passing the shanks of bolts 33 through alined openings provided in the units and washers 31, there being nuts 34 threaded to the free ends of the bolts for clamping the end walls and units in assembled position.

From the foregoing description, it will be seen that water entering the inlet 13 will pass into the heater and will flow therethrough in a circuitous path indicated by the arrows in Figure 1 until reaching the outlet, from where the same flows through a pipe 35 to the faucet of the hot water system. In passing through the heater, the same travels between the restricted passages 32, the flow being prolonged by reason of the corrugated walls, and which gives the heating elements ample time to thoroughly heat the water. The number of heating units 23 embodied in a heater is governed by the pressure or volume of water to be heated, and may be varied accordingly.

In the drawings I have shown the heater as being substantially diamond shaped in end elevation as shown in Figure 2, but I do not wish to limit myself to such configuration as it may be constructed in various shapes if desired.

Assume that there is no flow of water through the heater and that the control faucet is turned on, thus starting the flow therethrough. Upon starting of the flow through the system, the pressure of the water acts upon the plate 18, thus swinging the same to a raised position as shown in dotted lines in Figure 1 and when moved to such position, the switch arm 20 engages the contact 21 and closes the electric circuit 22 through the heating coils 28. The switch will remain on as long as the water continues to flow through the heater, but upon shutting off of the flow, the plate 18 drops by gravity to the vertical position shown in Figure 1, thus opening the circuit 22. By reason of this electric switch controlled by the flow of water through the heater, the electric heating elements are automatically controlled.

While I have shown and described what I deem to be the most desirable embodiment of my invention, I wish it to be understood that various changes in construction may be resorted to if desired without in any way departing from the spirit of the invention and I do not limit myself to the exact details of construction herein shown and described, nor to anything less than the whole of my invention, limited only by the appended claim.

Having thus described the invention, what I claim as new and desire to secure by Letters Patent is:—

An electric water heater comprising spaced end walls, one end wall having a water inlet and the other a water outlet, a plurality of spaced identical heating units secured between said end walls, a securing element passing through said end walls and said units for securing the same together, each of said heating units having an opening adjacent one end and including spaced corrugated heating walls, a heating element between said corrugated heating walls of each unit, the corrugated walls of said units and the end walls cooperating to provide passages therebetween, the opening in one unit being in reverse position with respect to the opening in the next adjacent unit to provide an undulated circuitous passage between said water inlet and said water outlet.

In testimony whereof I affix my signature.
EDWARD A. LONERGAN.